(12) United States Patent
Chiappetta et al.

(10) Patent No.: US 11,585,280 B2
(45) Date of Patent: Feb. 21, 2023

(54) AIRCRAFT AND METHOD OF OPERATING SAME

(71) Applicant: PRATT & WHITNEY CANADA CORP., Longueuil (CA)

(72) Inventors: Santo Chiappetta, Georgetown (CA); David H. Menheere, Norval (CA); Timothy Redford, Campbellville (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 63 days.

(21) Appl. No.: 17/088,128

(22) Filed: Nov. 3, 2020

(65) Prior Publication Data

US 2022/0136448 A1 May 5, 2022

(51) Int. Cl.
*F02C 9/18* (2006.01)
*B64D 27/18* (2006.01)

(52) U.S. Cl.
CPC ............... *F02C 9/18* (2013.01); *B64D 27/18* (2013.01); *F05D 2220/323* (2013.01); *F05D 2260/606* (2013.01); *F05D 2260/80* (2013.01); *F05D 2270/051* (2013.01); *F05D 2270/093* (2013.01); *F05D 2270/335* (2013.01)

(58) Field of Classification Search
CPC ... F02C 9/18; F02C 6/08; B64C 15/02; B64D 27/18
See application file for complete search history.

(56) References Cited

U.S. PATENT DOCUMENTS

| | | | | |
|---|---|---|---|---|
| 3,154,917 A | * | 11/1964 | Williamson | ........ B64C 29/0016 415/60 |
| 3,173,628 A | | 3/1965 | Marchant et al. | |
| 3,387,457 A | * | 6/1968 | Garraway | ................. F02K 3/12 60/762 |
| 3,677,501 A | * | 7/1972 | Denning | ................... F02K 3/04 244/1 N |
| 2003/0183723 A1 | * | 10/2003 | Bevilaqua | ........... B64C 29/0066 244/12.5 |
| 2008/0234880 A1 | * | 9/2008 | Delporte | ............. G05D 1/0808 701/5 |
| 2017/0253342 A1 | | 9/2017 | De Magalhaes Gomes | |
| 2017/0361941 A1 | * | 12/2017 | Kiebles | ................... B64C 15/02 |

FOREIGN PATENT DOCUMENTS

| | | |
|---|---|---|
| RU | 2494920 | 10/2013 |
| WO | 8403480 | 9/1984 |

* cited by examiner

*Primary Examiner* — Katheryn A Malatek
(74) *Attorney, Agent, or Firm* — Norton Rose Fulbright Canada LLP

(57) ABSTRACT

The aircraft can have a first engine secured to a first wing on a first side of a fuselage, and a second engine secured to a second wing on a second side of the fuselage, the second wing having a proximal end secured to the fuselage, and a distal end extending away from the fuselage. While operating the first engine, compressed gas can be conveyed from the first engine to a thrust generating device located at the distal end of the second wing.

10 Claims, 2 Drawing Sheets

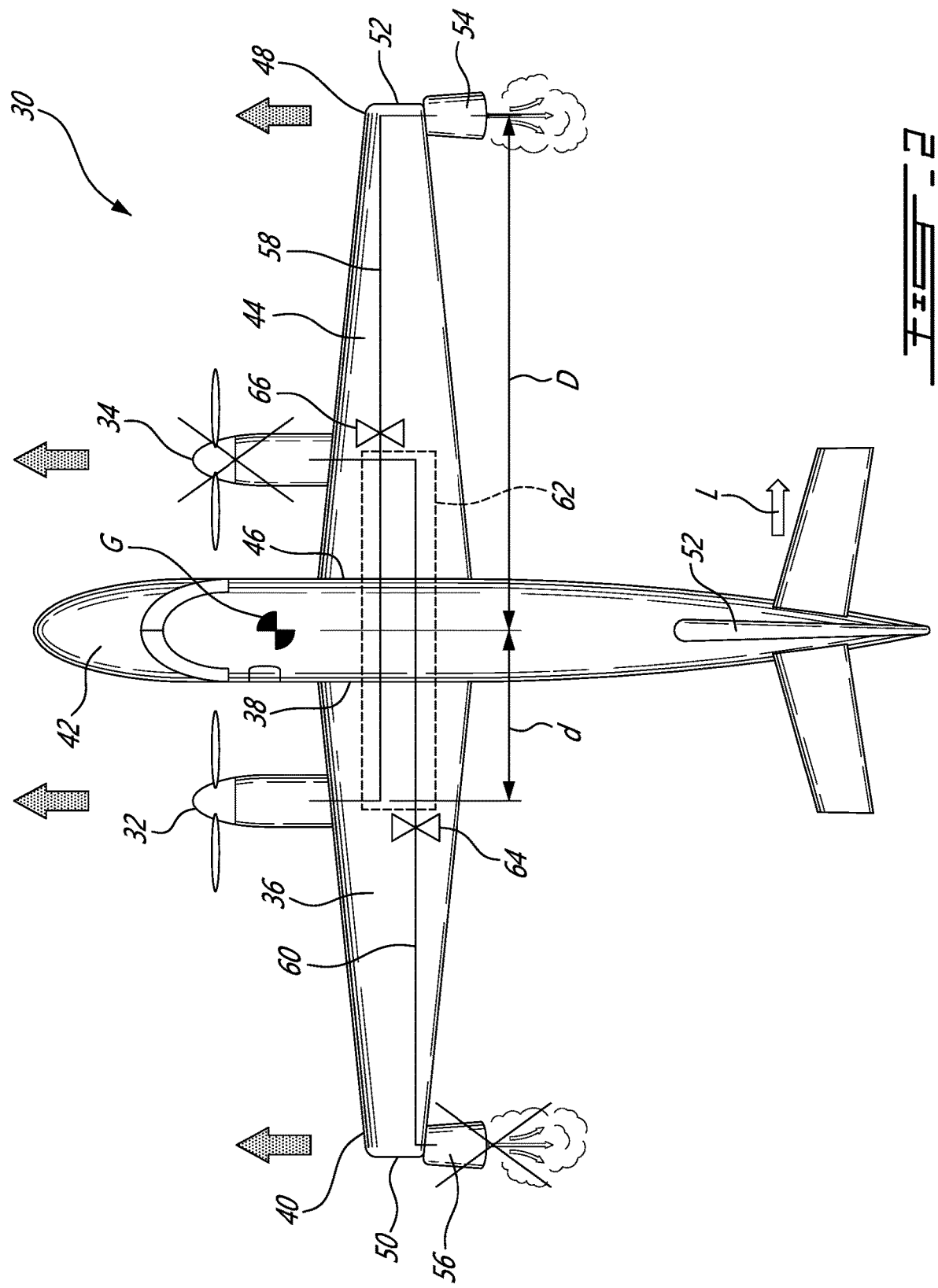

AIRCRAFT AND METHOD OF OPERATING SAME

TECHNICAL FIELD

The application relates generally to aircrafts and, more particularly, to the propulsion and stabilisation systems thereof.

BACKGROUND OF THE ART

Some events, such as engine failure for instance, can cause disruptions to the ability of an aircraft to stay its course. Engine failure in the case of a twin-engine aircraft, for instance, leads to a scenario where the operating engine generates torque around the center of gravity of the aircraft, which can induce yaw. The torque corresponds to the thrust (force) generated by the operating engine times the distance with the center of gravity of the aircraft. To a certain extent, such torque can be compensated using a tail rudder, but ensuring that the tail rudder will be able to compensate for this torque may require oversizing the tail rudder compared to the size it would otherwise require, leading, amongst other potentially undesirable aspects, to additional weight. There always remains room for improvement.

SUMMARY

In one aspect, there is provided a method of operating an aircraft having a first engine secured to a first wing on a first side of a fuselage, and a second engine secured to a second wing on a second side of the fuselage, the second wing having a proximal end secured to the fuselage, and a distal end extending away from the fuselage, the method comprising: while operating the first engine, conveying compressed gas from the first engine to a thrust generating device located at the distal end of the second wing, and the thrust generating device generating thrust using the energy of the compressed gas.

In another aspect, there is provided an aircraft having: a fuselage; a first wing extending on a first side of the fuselage from a proximal end to a distal end; a second wing extending on a second side of the fuselage from a proximal end to a distal end; a first thrust generating device located at the distal end of the second wing; a second thrust generating device located at the distal end of the first wing; a first compressed gas passage extending from the first engine to the first thrust generating device; a second compressed gas passage extending from the second engine to the second thrust generating device; the first and second thrust generating devices being configured to generate thrust using energy from the expansion of compressed gas received from the corresponding compressed gas passage.

DESCRIPTION OF THE DRAWINGS

Reference is now made to the accompanying figures in which:

FIG. 2 is a schematic top plan view of an aircraft.

DETAILED DESCRIPTION

Figure 1:
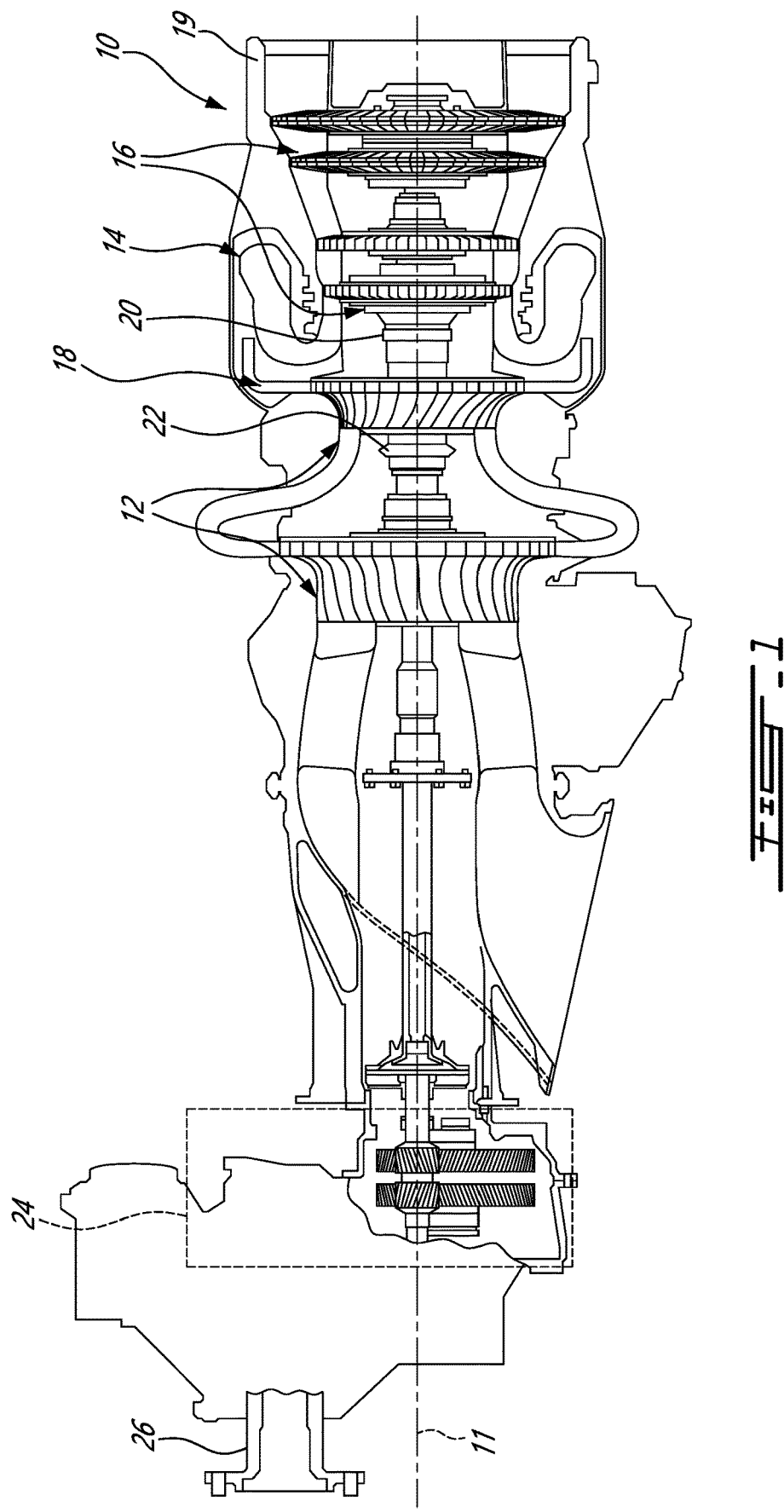
FIG. 1 is a schematic cross-sectional view of a gas turbine engine.

FIG. 1 illustrates an example of a turbine engine. In this example, the turbine engine 10 is a turboprop engine generally comprising in serial flow communication, a compressor section 12 for pressurizing the air, a combustor section 14 in which the compressed air is mixed with fuel and ignited for generating an annular stream of hot combustion gases around the engine axis 11, and a turbine section 16 for extracting energy from the combustion gases. The turbine engine 10 terminates in an exhaust section 19.

The fluid path extending sequentially across the compressor section 12, the combustor section 14 the turbine section 16 and the exhaust section 19 can be referred to as the core gas path 18. In the embodiment shown in FIG. 1, the turboshaft engine 10 has two compressor and turbine stages, including a high pressure stage associated to a high pressure shaft 20, and a low pressure stage associated to a low pressure shaft 22. The low pressure shaft 22 is used as a power source for a propeller during use. Turboprop engines typically have some form of gearing by which the power of the low pressure shaft 22 is transferred to an external shaft 26 bearing blades or propeller. This gearing, which can be referred to as a gearbox 24 for the sake of simplicity, typically reduces the rotation speed to reach an external rotation speed which is better adapted to rotate the blades or propeller for instance.

Turbofans are another common type of aircraft engine. Instead of using a propeller, turbofans typically have a fan extending across a bypass duct, the bypass duct extending around the core gas path. The fan can be driven using a lower pressure turbine stage, for instance, while the compressor can be driven using a higher pressure turbine stage, via a concentric shaft arrangement.

FIG. 2 presents an example aircraft 30 having a first engine 32 and a second engine 34. The first engine 32 is supported by a first wing 36 extending from a proximal end 38 to a distal end 40 on a first side of the fuselage 42, whereas the second engine 34 is supported by a second wing 44 extending from a proximal end 46 to a distal end 48 on a second side of the fuselage 42. The engines 32, 34 are at an intermediary location along the corresponding wing 36, 44, between the fuselage 42 and the wing tip 50, 52, and are typically closer to the fuselage 42 than to the wing tip 50, 52. During a typical mode of operation of the aircraft 30, both engines 32, 34 generate an equal amount of thrust. Each engine 32, 34 being separated from the center of gravity G of the aircraft 30 by a spacing distance d, they generate a yawing torque in opposite directions, and the yawing torques generated cancel each other out, leaving no significant amount of net torque affecting the orientation of the aircraft relative to its course. If, however, one of the engine, e.g. the second engine 34, fails, it will stop generating its yawing torque, and therefore stop balancing the yawing torque of the other engine. To a certain extent, this can be compensated by operating a rudder 52, typically incorporated into a vertical stabilizer located at the tail of the aircraft 30, to generate a laterally oriented "lift" force to generate a torque opposite to the torque generated by the operating engine. Enabling the rudder 52 to generate a sufficient amount of torque, may require oversizing the rudder 52, which may be undesirable, for instance.

In the illustrated embodiment, the aircraft further comprises two thrust generating devices: a first thrust generating device 54 located at the distal end 48 of the second wing 44, at or near the wing tip 52, and a second thrust generating device 56 located at the distal end 40 of the first wing 36, at or near the wing tip 50. Compressed gas passages 58, 60 are provided which can convey compressed gas, such as exhaust gasses or compressor bleed air for instance, depending on what is most suitable in view of a specific application. Each compressed gas conduit 58, 60 extends from a corresponding one of the engines 32, 34, across the fuselage 42, to the thrust generating device 54, 56 located on the other side of the aircraft 30. The first compressed gas passage 58, extending from the first engine 32 to the first thrust generating device 54, can be entirely distinct from, or have a common segment 62 shared with the second compressed gas passage 60. If a segment 62 of the passages is shared, valves can be used to selectively close the non-common, dedicated segments associated to the first engine 32 and first thrust generating device 54 from the common segment, while maintaining the dedicated segments associated to the second engine 34 and the second thrust generating device 56 in fluid communication with the shared segment, or vice versa. Using a shared segment can reduce weight by contrast with using two fully dedicated lines or ducts, for instance. The gas passages 58, 60 can alternately be configured in a manner to be left permanently open, or to be selectively openable or closable depending on the needs such as to maximize efficiency.

The thrust generating devices 54, 56 are configured to generate thrust using energy from the expansion of the compressed gas conveyed across the compressed gas passage. In one embodiment, the thrust generating devices 54, 56 can be jet nozzles for instance. In another embodiment, the thrust generating devices can have a turbine extracting energy from the expanding gas and driving a propeller or compressor (e.g. fan) into rotation, for instance. The exact choice of the type of thrust generating device for a given embodiment can be left to the designer to be made in view of the specificities of that embodiment. In some embodiments, the thrust generating devices can integrate eductors/ejectors. The amount of thrust generated by the thrust generating device can be controllable in some embodiments. For instance, a valve or other similar device can be present upstream of the thrust generating device in the compressed gas passage and control the degree of opening of the compressed gas passage, or the nozzle can have a variable nozzle area. Alternately, the thrust generating device can be connected to the corresponding engine solely by static components. Nozzles are relatively lightweight devices and can thus generate thrust with a lower weight penalty than other mechanical devices. Similarly, as a means of diverting engine power, ducting/lines can be relatively light weight as compared to other forms of mechanical or electrical power transferring techniques.

The thrust generating devices 54, 56 can be configured to operate permanently, i.e. as long as the engine 34, 36 from which their compressed gas source is derived operates and generates the compressed gas. Alternately, the aircraft 30 can include fluid flow control devices, which will be referred to herein as valves for simplicity, such as a first valve 66 in the first compressed gas conduit 58, and a second valve 64 in the second compressed gas conduit 60, or any other configuration of valves found suitable for a given application, and the valves can be selectively operable to open or close the corresponding conduit, or a corresponding segment of the compressed gas passage network. The valves can either be configured to switch between the open or closed configuration, or to be gradually openable to corresponding intermediate configurations between the open and closed configuration, depending on the needs. For instance, partially opening one valve to operate one of the thrust generating devices at partial power may be relevant if the other engine is still operating at partial power, or to voluntarily exert a yaw-inducing torque to the aircraft, for instance. Any suitable mechanism can be used as the valve. As such, the valves can be selectively controlled to control the operation of the corresponding thrust generating device. For instance, a corresponding valve can be switched to the fully open configuration to fully drive the corresponding thrust generating device in the event of failure of the other engine, while being maintained in the fully closed configuration to avoid or mitigate any associated power/efficiency loss when both engines operate normally.

The thrust generating devices 54, 56 can be located at a greater distance D from the center of gravity G than the corresponding engines 32, 34, and therefore, can compensate the torque generated by the corresponding engine 32, 34 even if they do not generate as much thrust as the corresponding engine. The thrust generating devices, compressed gas passages can be sized and configured, or controlled, in a manner to fully compensate for the yawing torque of the engine it is associated to (meaning that the value of the thrust times the distance with the center of gravity G is equal and opposite for the thrust generating device and engine), to partially compensate for the yawing torque of the engine it is associated to, or to overly compensate for the yawing torque of the engine it is associated to. Indeed, the thrust generating device and the associated conduits can generate a weight and cost penalty to the aircraft. This weight and cost penalty may be greater if configured in a manner to fully compensate the yawing torque of the corresponding engine, than if designed to cooperate with the rudder 52 in compensating the yawing torque of the corresponding engine, for instance.

Accordingly, in one embodiment, in the event of an engine failure, such as engine 34 for instance, the second thrust generating device and second engine 34 can remain inoperative while engine 32 remains operative, thrust generating device 54 is operated in a manner to generate a maximum amount of thrust which is still not enough to fully compensate the yawing torque generated by the first engine 32, and the rudder 52 can be operated to generate transversal, horizontal lift L and cooperate with the thrust generated by the first thrust generating device 54 in canceling out the yawing torque generated by the first engine 32.

In one embodiment, the compressed gas can be compressed air bled within the compressor section, e.g. from a radially outer wall of the compressor gas path or between the compressor and the combustor. The compressed gas source can be a port in the form of one or more manifold inlets configured to receive the compressed air.

In another embodiment, the compressed gas can be exhaust gas received from the turbine and/or exhaust sections, e.g. from a radially outer wall of the turbine gas path or from across the exhaust duct. The compressed gas source can be a port in the form of one or more manifold inlets configured to receive exhaust gasses from the turbine and/or exhaust sections. In some embodiments, a fluid flow control devices/valve can be integrated to the port itself, whereas in alternate embodiments a fluid flow control device/valve can be located at an intermediary position along the compressed air conduit, or at the compressed air outlet leading into the thrust generating device, for example. Conduits used to convey compressed gas are often referred to as lines, whereas conduits used to convey exhaust gasses are often referred to as ducts. The expression compressed gas passage will be used herein to cover both scenarios.

The embodiments described in this document provide non-limiting examples of possible implementations of the present technology. Upon review of the present disclosure, a person of ordinary skill in the art will recognize that changes may be made to the embodiments described herein without departing from the scope of the present technology.

For example, It will be understood that while in the illustrated embodiment, the aircraft is a twin-engine turboprop aircraft, alternate embodiments can have more than two engines, such as four engines for instance, and that the engines can be other aircraft engines than turboprop engines, such as turbofan engines for instance. For the purpose of this specification, turbofan fans will be considered as compressors, and the compressed gas conduit can draw compressed air from the bypass ducts, for instance. In some embodiments, nozzle thrust can be augmented by electrically driven or mechanically driven boost compressors for instance, and can be statically parallel to the fuselage, or vectored to provide additional aircraft control. In an embodiment where the compressed gas is used to drive a fan or propeller, a wing tip fan or propeller can be driven using the compressed gas. The drive system could be either direct drive or via a reduction gear box from a power turbine. In still another embodiment, a compact or simplified turbofan can be used as wing tip thruster. In such a scenario, a power turbine can be used to drive a ducted fan, the power turbine can be driven by compressed air supplied from the main turboprop engine on the other side of the fuselage for instance, in which case this would be a turbofan engine without a core. The nozzle system could be either separate duct or mixed nozzle. In still an alternate embodiment, independent, fully functional gas turbine engines, having core engines and powered by fuel, can be used at or near the wing tips instead of the compressed-gas driven thrust generating devices. Indeed, using a small turbofan engine as a wing tip thruster would only require a fuel supply to the wing tip. For example, to achieve a 3.5 thrust ratio between the main engine and the wing tip thruster, a PW127 engine with a PW615 engine could be used to give the desired thrust ratio. This may allow using turbofans at the wing tips in addition to two twin turboprop as main engines. Even using such engines at the wing tip may lead to lesser weight penalties than some other mechanical or electrical power diversion strategies. Moreover, using such small, fully functional engines at the wing tips may allow downsizing the main engines to a certain extent, and therefore achieve a better overall weight utilization. Yet further modifications could be implemented by a person of ordinary skill in the art in view of the present disclosure, which modifications would be within the scope of the present technology.

The invention claimed is:

1. A method of operating an aircraft having a first engine secured to a first wing on a first side of a fuselage, and a second engine secured to a second wing on a second side of the fuselage, the second wing having a proximal end secured to the fuselage, and a distal end extending away from the fuselage, the method comprising:
    operating the first engine, including generating a yawing torque relative to a center of gravity of the aircraft;
    while operating the first engine, conveying compressed gas from the first engine to a thrust generating device located at the distal end of the second wing, and
    the thrust generating device generating thrust using the energy of the compressed gas and compensating the yawing torque generated by the first engine relative to the center of gravity of the aircraft.

2. The method of claim 1 wherein the first engine has a compressor section, a combustor section, and a turbine section in sequential fluid flow communication, wherein the compressed gas source is bleed air from the compressor section.

3. The method of claim 1 wherein the first engine has a compressor section, a combustor section, a turbine section and an exhaust duct in sequential fluid flow communication, wherein the compressed gas source is exhaust gas from the exhaust duct.

4. The method of claim 1 wherein said generating thrust includes expanding the compressed gas in a jet nozzle of the thrust generating device.

5. The method of claim 1 wherein said generating thrust includes expanding the compressed gas in a turbine of the thrust generating device, said turbine driving a compressor.

6. The method of claim 1 wherein said generating thrust includes expanding the compressed gas in a turbine of the thrust generating device, said turbine driving a propeller.

7. The method of claim 1 further comprising said thrust generating device cancelling the yawing torque by a counter-torque generated by the thrust of the thrust generating device.

8. The method of claim 1 comprising generating said thrust while said second engine is inoperative.

9. The method of claim 1 further comprising while operating the first engine and generating said thrust, the thrust generating device being a first thrust generating device, operating the second engine, conveying compressed gas from the second engine to a second thrust generating device located at a distal end of the first wing, and the second thrust generating device generating thrust using the energy of the compressed gas conveyed from the second engine.

10. The method of claim 1 further comprising opening a passage conveying the compressed gas contingent upon detecting malfunction of the second engine.

* * * * *